(12) United States Patent
Chen et al.

(10) Patent No.: US 8,226,277 B2
(45) Date of Patent: Jul. 24, 2012

(54) LENS AND LED MODULE USING THE SAME

(75) Inventors: Chin-Chung Chen, Taipei Hsien (TW); Shi-Yu Song, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

(*) Notice: Subject to any disclaimer, the term of this patent is extended or adjusted under 35 U.S.C. 154(b) by 267 days.

(21) Appl. No.: 12/684,901

(22) Filed: Jan. 9, 2010

(65) Prior Publication Data

US 2011/0110100 A1 May 12, 2011

(30) Foreign Application Priority Data

Nov. 12, 2009 (CN) .......................... 2009 1 0309640

(51) Int. Cl.
*F21V 3/00* (2006.01)
*F21V 5/00* (2006.01)

(52) U.S. Cl. ................... 362/311.02; 362/335; 362/257; 362/310

(58) Field of Classification Search ............. 362/311.02, 362/800, 335, 347, 350, 257, 267, 310, 329, 362/311.01, 311.06, 311.07, 311.1, 311.14, 362/334; 359/362, 364, 366, 642, 648, 800, 359/808, 811, 819

See application file for complete search history.

(56) References Cited

U.S. PATENT DOCUMENTS

| | | | | |
|---|---|---|---|---|
| 5,836,676 A | * | 11/1998 | Ando et al. | 362/244 |
| 6,296,376 B1 | * | 10/2001 | Kondo et al. | 362/310 |
| 2004/0145895 A1 | * | 7/2004 | Ouderkirk et al. | 362/260 |
| 2004/0201987 A1 | * | 10/2004 | Omata | 362/230 |
| 2006/0083000 A1 | * | 4/2006 | Yoon et al. | 362/311 |

* cited by examiner

*Primary Examiner* — Anabel Ton
*Assistant Examiner* — Danielle Allen
(74) *Attorney, Agent, or Firm* — Altis Law Group, Inc.

(57) ABSTRACT

An LED module includes a printed circuit board, an LED mounted on the printed circuit board, and a lens fixed on the printed circuit board and covering the LED for refracting light emitted by the LED. The lens has a concaved inner face for incidence of the light and an opposite convex outer face for the light refracting out thereof. The inner and outer faces are both spherical. A curvature of the inner face is smaller than that of the outer face.

10 Claims, 4 Drawing Sheets

LENS AND LED MODULE USING THE SAME

BACKGROUND

1. Technical Field

The present disclosure relates generally to an LED module, and more particularly to an LED module for lighting and a lens applied in the LED module.

2. Description of Related Art

LED lamp, a solid-state lighting, utilizes LEDs as a source of illumination, providing advantages such as resistance to shock and nearly limitless lifetime under specific conditions. Thus, LED lamps present a cost-effective yet high quality replacement for incandescent and fluorescent lamps.

Known implementations of LED modules in an LED lamp employ lenses for focusing white light generated by the LEDs. Due to a forming mechanism of white light generated by the LEDs, the light pattern provided by the light is prone to be yellow or shining at edges, which is not suitable for illumination.

What is need therefore is a lens and an LED module using the lens which can overcome the above limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
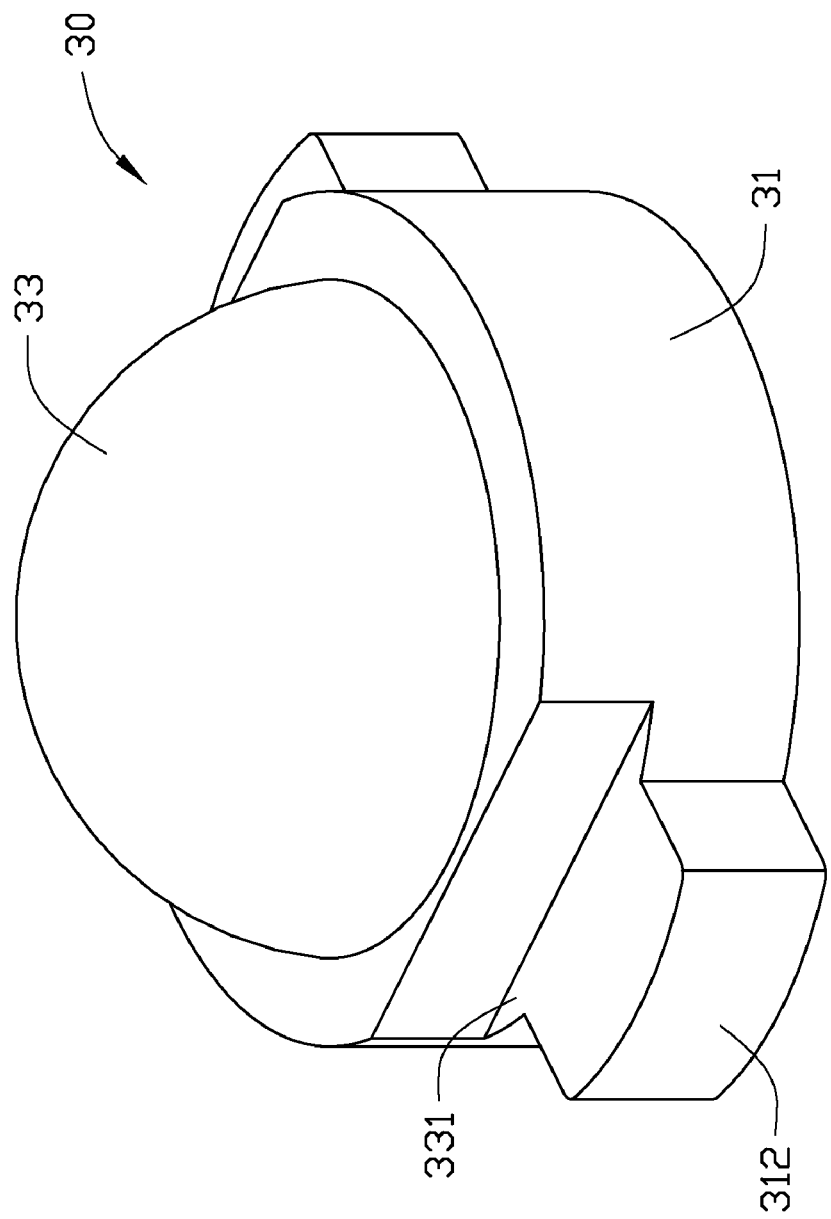
FIG. 1 is an isometric view of a lens in accordance with an embodiment of the present disclosure.
Figure 2:
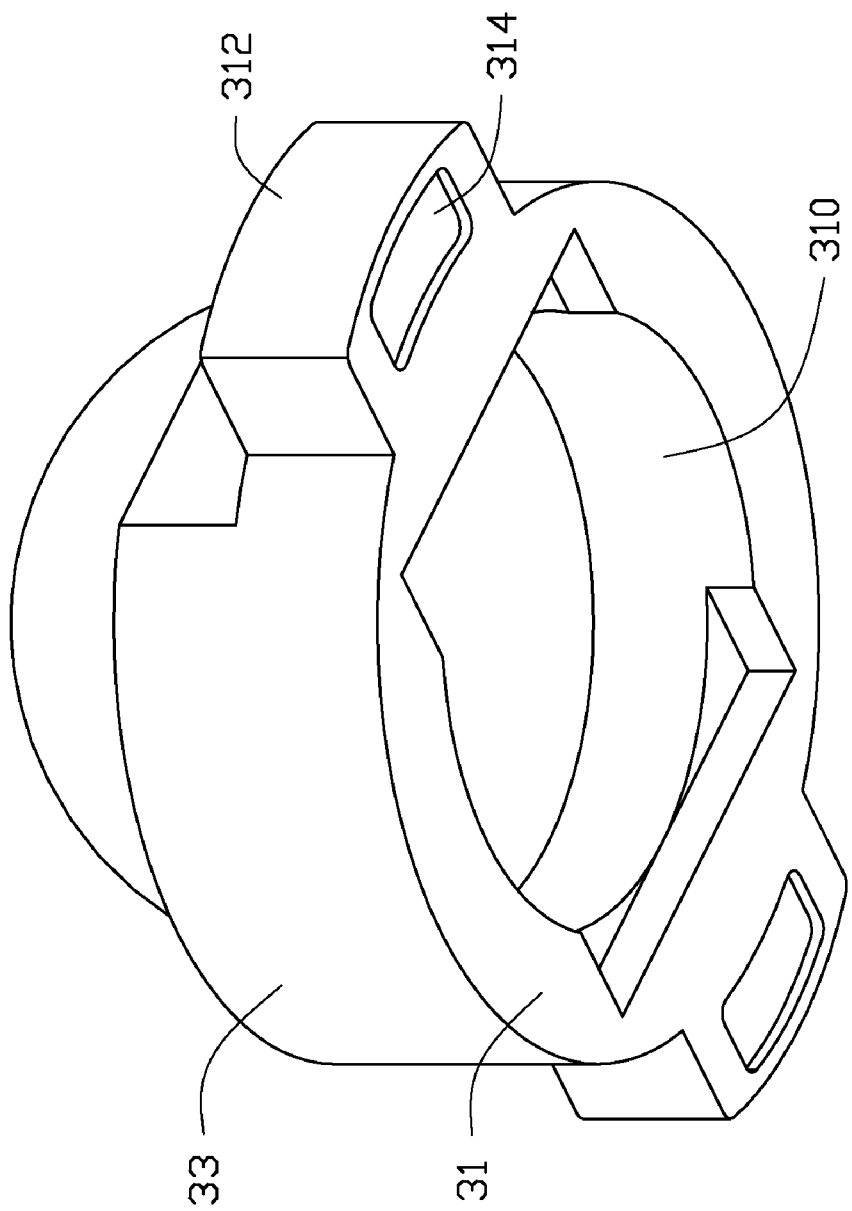
FIG. 2 is a view similar to FIG. 1, but shown from a different aspect.
Figure 3:
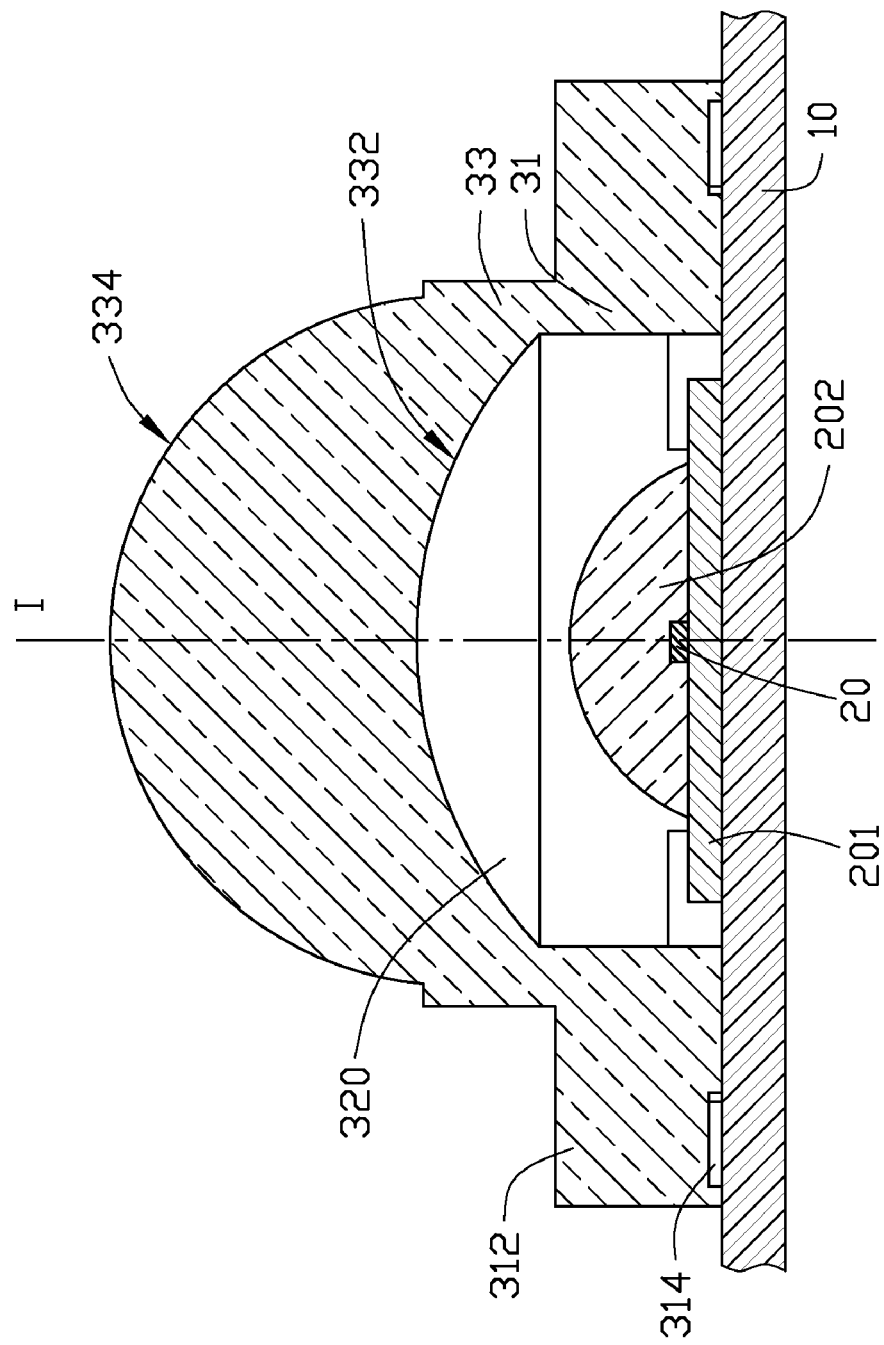
FIG. 3 is a cross-sectional view of an LED module with the lens of FIG. 1.

FIG. 3 illustrates, in cross section, an LED module in accordance with an embodiment of the present disclosure. The LED module comprises a printed circuit board 10, an LED 20 mounted on the printed circuit board 10 and a lens 30 covering the LED 20. Perspective views of the lens 30 from different aspects are shown in FIGS. 1 and 2. In detail, the LED 20 is mounted on a substrate 201 which is electrically connected to the printed circuit board 10. A semicircular encapsulant 202 is secured to the substrate 201 and covers the LED 20. The encapsulant 202 functions as a primary optical lens and a protector for the LED 20. The encapsulant 202 is made of transparent silicone. The lens 30 functions as a secondary optical lens for the LED 20.

The substrate 201 can be fixed onto the printed circuit board 10 by soldering or other means. The number of the LED 20 can be changed corresponding to a desired lighting intensity.

The lens 30 is integrally made of a transparent material with good optical performance, such as PMMA (polymethyl methacrylate) or PC (polycarbonate). The lens 30 comprises a base 31 and a light refracting portion 33 protruding upwardly from the base 31. The base 31 is substantially disk shaped. A recess 310 is defined in a middle of a bottom of the base 31. A substantially rectangular fixing ear 312 extends from each lateral side of the base 31. Heights of the fixing ears 312 are similar to that of the base 31. Bottoms of the fixing ears 312 and base 31 are fixed onto the printed circuit board 10. The fixing ears 312 cause the lens 30 to have a large connecting area with the printed circuit board 10, thereby making the lens 30 be more securely connected to the printed circuit board 10. Besides, the fixing ears 312 function as a member facilitating positioning of the securement of the lens 30 to the printed circuit board 10. A fixing groove 314 is defined in a bottom of the fixing ear 312 for receiving glue or the like therein, which is used for adhering the lens 30 to the printed circuit board 10.

The light refracting portion 33 protrudes upwardly from a middle top of the base 31. The light refracting portion 33 has a concaved inner face 332 at a bottom thereof and an opposite convex outer face 334. The concaved inner face 332 is exposed to the recess 310 of the base 31. A concaved bottom surrounded by the inner face 332 of the refracting portion 33 communicates with the recess 310 to cooperatively define a receiving room 320 receiving the LED 20 therein. The inner face 332 is provided for an incidence of the light generated by the LED 20, and the outer face 334 is provide for refracting the light. The inner and outer faces 332, 334 are both spherical, and a curvature of the inner face 332 is smaller than that of the outer face 334. Preferably, the curvature of the inner face 332 is 0.15 mm$^{-1}$, and the curvature of the outer face 334 is 0.193 mm$^{-1}$. A connecting line of centers of the inner and outer faces 332, 334 is coincident with an optical axis I of the lens 30 which extends through a center of the lens 30. The lens 30 is centrosymmetric relative to the axis I. Projections of the inner and outer faces 332, 334 at the bottom of the base 31 are circular. A diameter of the projection of the inner face 332 at the bottom of the base 31 is smaller than that of the projection of the outer face 334 at the bottom of the base 31.

Figure 4:
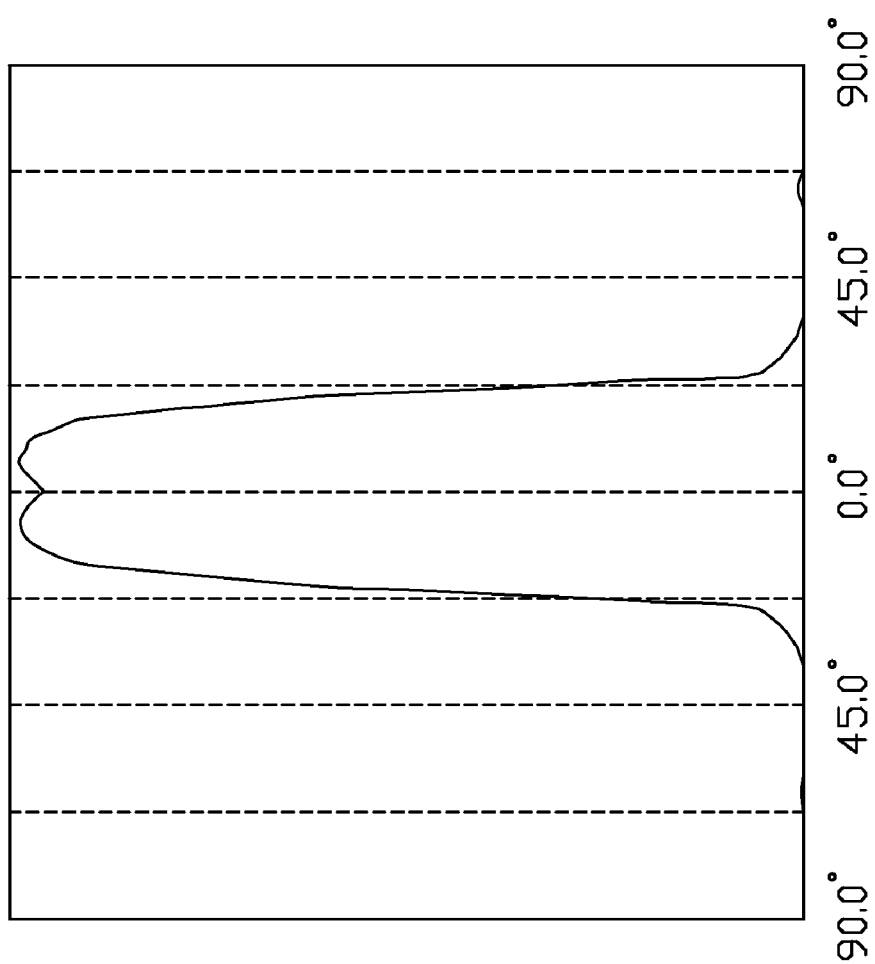
FIG. 4 is a graph of light intensity vs. angle for the LED module of FIG. 3.

FIG. 4 shows a curve of the light intensity vs. angle for the LED module in accordance with the present disclosure. After the light being refracted by the lens 30 to leave the outer face 334, most of the light, specifically, 95% of the light is located within 22.5 degrees off the axis I; namely, an illumination angle of the LED module is about 45 degrees. When the light off the axis I is more than 20 degrees, the light intensity decreases sharply. The curvatures of the inner and outer faces 332, 334 can be altered in different embodiments to focus the light at different ranges such as 30 degrees or 60 degrees. Since the structures of different lenses with different illumination ranges are similar to each other, a cutout 331 is preferably defined in each lateral side of the light refracting portion 33 for distinguishing the lenses 30 from each other by setting different sizes of the cutout 331.

By a computer analysis, the light pattern formed by the LED module of present disclosure has a uniformly illumination. Compared with the conventional LED module, the light pattern of the present disclosure has no yellow or shining edges, which is more comfortable for users when the LED module is used for illumination application.

Understandably, according to actual requirement, a number of the LED modules can be mounted on the printed circuit board 10. The LED modules can be arranged in a matrix or circle or other shape.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens for refracting light emitted by an LED (light emitting diode), comprising a base for receiving the LED therein and a light refracting portion protruding upwardly from the base, the light refracting portion defining a concaved inner face at a bottom thereof for incidence of the light into the light refracting portion and an opposite convex outer face at a top thereof for refracting the light out of the light refracting portion, wherein the inner and outer faces are spherical and a curvature of the inner face is smaller than that of the outer face;

wherein a recess is defined in a middle of a bottom of the base and communicates with the bottom of the light refracting portion to cooperatively define a receiving room for receiving the LED; and wherein a cutout is defined in a lateral side of the light refracting portion.

2. The lens as claimed in claim 1, wherein a diameter of a projection of the inner face at the bottom of the base is smaller than that of a projection of the outer face at the bottom of the base.

3. The lens as claimed in claim 1, wherein a fixing groove is defined in the bottom of the base.

4. The lens as claimed in claim 3, wherein the base comprises a fixing ear at a lateral side of the base, and the fixing groove is defined in a bottom of the fixing ear.

5. The lens as claimed in claim 1, wherein the curvature of the inner face is 0.15 mm$^{-1}$, and the curvature of the outer face is 0.193 mm$^{-1}$.

6. An LED (light emitting diode) module comprising:
a printed circuit board;
an LED mounted on the printed circuit board; and
a lens fixed on the printed circuit board and covering the LED for refracting light emitted by the LED, the lens having a concaved inner face for incidence of the light and an opposite convex outer face for the light refracting out thereof;

wherein the inner and outer faces are spherical, and a curvature of the inner face is smaller than that of the outer face;

wherein the lens comprises a base and a light refracting portion protruding upwardly from the base, a recess is defined in a middle of a bottom of the base and communicates with a bottom of the light refracting portion to cooperatively define a receiving room receiving the LED; and wherein two fixing ears extend from two lateral sides of the base respectively for fixing the lens onto the printed circuit board.

7. The LED (light emitting diode) module as claimed in claim 6, wherein a fixing groove is defined in a bottom of each fixing ear for receiving glue.

8. The LED (light emitting diode) module as claimed in claim 6, wherein a cutout is defined in each lateral side of the light refracting portion.

9. The LED (light emitting diode) module as claimed in claim 6, wherein the curvature of the inner face is 0.15 mm$^{-1}$, and the curvature of the outer face is 0.193 mm$^{-1}$.

10. A lens for refracting light emitted by an LED (light emitting diode), comprising a base for receiving the LED therein and a light refracting portion protruding upwardly from the base, the light refracting portion defining a concaved inner face at a bottom thereof for incidence of the light into the light refracting portion and an opposite convex outer face at a top thereof for refracting the light out of the light refracting portion, wherein the inner and outer faces are spherical and a curvature of the inner face is smaller than that of the outer face;

wherein a recess is defined in a middle of a bottom of the base and communicates with the bottom of the light refracting portion to cooperatively define a receiving room for receiving the LED; and wherein a fixing groove is defined in the bottom of the base.

* * * * *